US006461418B1

(12) United States Patent
Yue et al.

(10) Patent No.: US 6,461,418 B1
(45) Date of Patent: Oct. 8, 2002

(54) AQUEOUS INK JET INKS FOR USE WITH COMMERCIAL OFFSET MEDIA AND OFFSET INK

(75) Inventors: Shunqiong Yue; George M. Sarkisian; Mark L. Choy; Yi-Hua Tsao; Howard A Doumaux, all of San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/675,043

(22) Filed: Sep. 28, 2000

(51) Int. Cl.$^7$ ................................................ C09D 11/02
(52) U.S. Cl. ................ 106/31.58; 106/31.86; 106/31.37; 106/31.69; 106/31.43; 106/31.75
(58) Field of Search .................. 106/31.58, 31.86, 106/31.37, 31.69, 31.43, 31.75

(56) References Cited

U.S. PATENT DOCUMENTS

| 5,221,334 | A | | 6/1993 | Ma et al. ................... 106/20 D |
|---|---|---|---|---|
| 5,356,464 | A | | 10/1994 | Hickman et al. ......... 106/20 R |
| 5,395,431 | A | | 3/1995 | Siddiqui et al. ........... 106/20 R |
| 5,626,655 | A | | 5/1997 | Pawlowski et al. |
| 5,643,357 | A | * | 7/1997 | Breton et al. ............. 106/31.25 |
| 5,658,376 | A | | 8/1997 | Noguchi et al. ......... 106/31.43 |
| 5,709,737 | A | | 1/1998 | Malhotra et al. ........ 106/31.43 |
| 5,746,818 | A | * | 5/1998 | Yatake ..................... 106/31.28 |
| 5,852,075 | A | | 12/1998 | Held ......................... 523/161 |
| 5,868,822 | A | | 2/1999 | Yui et al. ................. 106/31.26 |
| 5,876,491 | A | | 3/1999 | Gunn et al. .............. 106/31.46 |
| 5,883,157 | A | | 3/1999 | Yamashita et al. .......... 523/161 |
| 5,973,026 | A | | 10/1999 | Burns et al. |
| 6,015,057 | A | * | 4/2000 | Yatake et al. ............. 106/31.58 |
| 6,087,416 | A | | 7/2000 | Pearlstine et al. .......... 523/160 |
| 6,123,502 | A | * | 9/2000 | Adams et al. ............. 414/44.5 |
| 6,153,001 | A | * | 11/2000 | Suzuki et al. ............ 106/31.65 |
| 6,261,350 | B1 | * | 7/2001 | Kabalnov ................ 106/31.33 |

FOREIGN PATENT DOCUMENTS

| EP | 0690107 A2 | 1/1996 |
|---|---|---|
| EP | 0882771 A2 | 3/1998 |
| EP | 0882771 A3 | 3/1998 |
| EP | 0924272 A1 | 6/1999 |

OTHER PUBLICATIONS

Copy of International Search Report; PCT/US01/30559; Dated: Apr. 24, 2002.

* cited by examiner

Primary Examiner—Helene Klemanski
Assistant Examiner—Veronica F. Faison

(57) ABSTRACT

The present invention is directed to aqueous based ink compositions for ink jet printing on offset media and offset ink comprising various combinations of nonionic surfactants. Such formulations include effective amounts of an ink colorant and a nonionic surfactant having an HLB value from about 4 to 14. Optionally, additional nonionic surfactants, solvents, and binders can be added. In another formulation, an effective amount of an ink colorant, at least two nonionic surfactants, each being present at from about 0.01% to 10% by weight (preferably 0.01% to 2% by weight) and an effective amount of at least one binder (such as an acrylate binder) is disclosed.

31 Claims, No Drawings

AQUEOUS INK JET INKS FOR USE WITH COMMERCIAL OFFSET MEDIA AND OFFSET INK

FIELD OF THE INVENTION

The present invention is directed to aqueous ink jet ink compositions for use with commercial offset media and offset ink.

BACKGROUND OF THE INVENTION

In recent years, computer printer technology has evolved to a point where very high resolution images can be transferred to various media, including papers of different types. One particular type of printing involves the placement of small drops of a fluid ink onto a surface in response to a digital signal. Typically, the fluid ink is placed or jetted onto the surface without physical contact between the printing device and the surface. The specific method for which the ink is deposited onto the printing surface varies from system to system. However, two major methods include continuous ink deposit and drop-on-demand ink deposit.

With regard to continuous printing systems, inks used are typically based on solvents including methyl ethyl ketone and/or ethanol. Essentially, continuous printing systems function as a stream of ink droplets are ejected and directed by a printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink jet inks are typically based upon water and glycols. Essentially, with these systems, ink droplets are propelled from a nozzle by heat or by a pressure wave. Additionally, all of the ink droplets are used to form the printed image and are ejected when needed.

In general, ink jet inks are either dye- or pigment-based. Dye-based inks typically use a liquid colorant that is usually water-based to turn the media a specific color. Because of their makeup, dye-based inks are usually not waterproof and tend to be more affected by UV light. This results in the color fading or changing over time. For optimum performance, this type of ink has often required that the proper media or substrate be selected in accordance with the application. In many circumstances, if the media is too dense or hydrophobic, the ink has difficulty penetrating and beads on the surface. Conversely, if the media is too absorbent, the dot gain is too high creating a blurred image.

Pigmented inks typically use a solid colorant to achieve color. In many cases, the line quality and accuracy of plots produced by pigment-based inks are usually superior to that of dye-based inks. With pigmented inks, solid particles adhere to the surface of the substrate. Once the water in the solution has evaporated, the particles will generally not go back into solution, and are therefore more waterproof. In addition, pigmented inks are much more UV resistant than dye-based inks, meaning that it takes much longer for noticeable fading to occur.

Though pigmented inks, in some areas, exhibit superior characteristics, dyes tend to run cleaner, provide better yield, offer better particle size, and are easier to filter. Thus, dye based inks have been more often used for common applications. Additionally, dye-based inks have tended to be more chromatic and provide more highly saturated colors.

There are several reasons that ink jet printing has become a popular way of recording images on surfaces, particularly paper. Some of these reasons include low printer noise, capability of high speed recording, and multi-color recording. Additionally, these advantages can be provided at a relatively low price. However, though there has been great improvement in ink jet printing, accompanying this improvement are increased printing demands, e.g., higher speed, higher resolution, full color image formation, etc. As such, there are several features to consider when evaluating a printer ink in conjunction with a printing surface or substrate. Such features include edge acuity and optical density of the image on the surface, dry time of the ink on the substrate, adhesion to the substrate, lack of deviation of ink droplets, presence of all dots, resistance of the dried ink to water and other solvents, long-term storage stability, and long-term reliability without corrosion or nozzle clogging. Though the above list of features provides a worthy goal to achieve, there are difficulties associated with satisfying all of the above features. Often, the inclusion of an ink component meant to satisfy one of the above characteristics can prevent another characteristic from being met. Thus, most commercial inks for use in ink jet printers represent a compromise in an attempt to achieve at least an adequate response in meeting some or all of the above listed requirements.

Papers used for ink jet printing have typically included high-quality or wood-free papers designed to have high ink absorptivity or papers having a coated porous surface. These papers are functionally good for ink jet printing because the inks may be absorbed readily and dry quickly. However, such papers often do not allow for a crisp or sharp image.

Conversely, with commercial offset paper, a nonporous smooth surface may provide a good printing surface for a crisp image. However, commercial offset coated papers are significantly different than office plain papers or photo/glossy papers specifically designed for ink jet media. Typically, with commercial offset papers, the smooth nonporous surface is comprised of a coating which requires more time for aqueous fluids to penetrate than standard paper. This is because diffusion-type adsorption must generally occur with offset papers as compared with capillary-type absorption which typically occurs with respect to standard office paper and some ink jet specialty papers. Additionally, offset coatings contain polymers that are more hydrophobic, e.g., styrene-butadiene based, than paper coatings specifically designed for ink jet ink, e.g., water-soluble polymers such as polyvinyl alcohol. Thus, because offset coatings are typically hydrophobic, have poor penetration, and are smooth and nonporous, these coatings tend to interact poorly with water-based inks. In addition, classic ink jet solvents such as glycols and diols tend to perform poorly on these coatings, showing long dry times and poor spreading characteristics.

The apparent incompatibility between offset media/ink and water based ink jet inks stems from the fact that offset media such as commercial offset paper was developed primarily for use with oil-based inks. For example, coated offset media often includes a hydrophobic component such as latex binder and/or various hydrophobic polymers. To illustrate, such polymers used in offset media can include polymers, copolymers, and/or terpolymers selected from the group consisting of polystyrene, polyolefins (polypropylene, polyethylene, polybutadiene), polyesters (PET), polyacrylate, polymethacrylate, and poly(maleic anhydride).

Because commercial offset paper provides a smooth surface for printing and would provide a convenient and inexpensive alternative to specialty papers, it would be useful provide aqueous based ink jet inks which can be used with commercial offset media, including papers and offset inks. Such formulations would be particularly useful if they exhibited a reduction in ink dry out in ink jet nozzles. Additionally, these ink jet inks would also be desirable if they exhibited printing properties on offset media including excellent text and area fill, minimal coalescence in half tone images, excellent optical density (OD) and edge acuity, good water fastness, good smudge and rub resistance, and good lightfastness.

SUMMARY OF THE INVENTION

The present invention is drawn to aqueous based ink compositions for ink jet printing on offset media and offset ink. One embodiment comprises effective amounts of an ink colorant and a nonionic surfactant having an HLB value from about 4 to 14. Optionally, additional nonionic surfactants, solvents, and binders can be added. Another embodiment comprises an effective amount of an ink colorant, at least two nonionic surfactants, each being present at from about 0.01% to 10% by weight, and an effective amount of at least one polymeric binder, such as an acrylate binder.

DETAILED DESCRIPTION OF THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the content clearly dictates otherwise.

"Surfactant" is a compound that contains a hydrophilic and a hydrophobic segment. Thus, when a surfactant is added to water or some other solvent, the surface tension of the system can be reduced. In general, surfactants can be used for several purposes including wetting, emulsifying, dispersing, foaming, scouring, or lubricating a system.

"HLB" or "Hydrophilic/Lipophilic Balance" is a way of classifying surfactants. Specifically, the HLB scale ranges from 0 to 40 wherein the products with a low HLB are more oil soluble and products with a higher HLB are more water soluble. The HLB is a numerically calculated number based on the surfactants molecular structure, thus, it is not a measured parameter.

With this in mind, an aqueous ink composition for ink jet printing on offset media and offset ink is disclosed comprising effective amounts. of ink colorant and a nonionic surfactant having an HLB value from about 4 to 14. In one embodiment, an effective amount of a second nonionic surfactant can be added to the composition. The HLB value of the second nonionic surfactant can be any functional value. However, it is preferred that the second nonionic surfactant also have an HLB value from about 4 to 14.

If one nonionic surfactant is used, the nonionic surfactant can be present at from 0.01% to 10% by weight, preferably from about 0.01% to 5% by weight, and most preferably from about 0.01% to 2% by weight. However, if two or more nonionic surfactants are used, each nonionic surfactant can be present at within these ranges. Suitable nonionic surfactants for use can include alkoxylated octylphenols, alkyl phenoxypoly(ethleneoxy)ethanols, silicone glycol copolymers including polyalkylene oxide-modified polydimethylsiloxanes, alkoxlyated tetramethyl decyndiols, alkoxylated trimethylnonanols, polyoxyethylene ethers, ethylene oxide/propylene oxide copolymers, fluorosurfactants, and nonionic alkoxylated surfactants. Preferred alkoxylates for above are ethoxylate and propoxylates.

Nonionic surfactants can be obtained from several sources, including those with the tradenames TRITONS™, IGEPALS™, SILWETS™, SURFYNOLS™, TERGITOLS™, BRIJS™, PLURONICS™, FLUOKADS™, and ZONYLS™

As is the case with many ink jet inks, the ink colorant is preferably selected from the group consisting of pigments and dyes. However, in either case, the ink colorant should be present at from about 0.1% to 10% by weight. In one embodiment, an acrylate binder (water soluble or water dispersible acrylate polymer) or another functionally equivalent binder can be used such as an acrylic acid or a methacrylate acid including its esters. Preferably, the binder can be present at from about 0.01% to 10% by weight and a preferred molecular weight range can be from about 1,000 to 15,000.

Also, an aqueous ink composition for ink jet printing on offset media and offset ink is also disclosed comprising an effective amount of ink colorant; at least two nonionic surfactants, each being present at from about 0.01% to 10% by weight; and an effective amount of at least one binder. In this embodiment, one of the at least two nonionic surfactants can have an HLB value from about 4 to 14. In another embodiment, two or more of the at least two nonionic surfactants can have an HLB value from about 4 to 14.

Though no specific limitation regarding the amount of ink colorant to be used (other than an effective amount) is required, it is preferred that the ink colorant be present at from about 0.1% to 10% by weight. Additionally, either pigments and/or dyes can be used in the formulation. For example, a suitable ink colorants can be the self-dispersed carbon pigment known as CABOJET™ 300. Additionally, ink colorants such as those described in U.S. Pat. Nos. 5,3,56,464 and 5,709,737, the entire teachings of which are incorporated herein by reference, can also be used. In this embodiment, the binder can preferably be an acrylate binder, an acrylic acid, a methacrylate acid including its esters, and combinations thereof. JONCRYL™ is one commercially available acrylate binder that is acceptable for use. Additionally, other water-insoluble monomers can be used for the binder. For example, the binder can be comprised of comonomers such as a styrene and a butyl methacrylate. Other suitable binders that can be used include polyamides, vinylalcohols, vinyl acetates, polyvinylpyrrolidones, cellulosics, and urethanes. The binder should be present at from about 0.01% to 10% by weight. Additionally, molecular weights for the binder can be from about 1,000 to 15,000. Though these inks and binders are discussed specifically, other ink colorants or binders optimized for thermal ink jet ink can also be used.

Solvents can also be added to the formulations for good results. Such solvents can include alcohols and polyhydroxylated solvents including glycerols, glycols, glycol ethers, pyrrolidones, and combinations thereof. When using one of these or other solvents, the solvent should be present at from 0.5 to 50% by weight. Additionally, as stated previously with respect to other embodiments, the nonionic surfactant(s) can be selected from the group consisting of alkoxylated octylphenols, alkyl phenoxypoly(alkyleneoxy) ethanols, silicone glycol copolymers including polyalkylene oxide-modified polydimethylsiloxanes, alkoxlyated tetramethyl decyndiols, alkoxylated trimethylnonanols, polyoxyethylene ethers, ethylene oxide/propylene oxide copolymers, fluorosurfactants, and nonionic alkoxylated surfactants.

As water is the major component in typical ink jet ink formulations, in the prior art, offset coatings have tended to interact poorly with aqueous inks. In addition, classic ink jet solvents such as glycols and diols tend to perform poorly alone on these coatings, showing long dry times and poor spreading characteristics. Prior to the present invention, offset media was typically printed on using water insoluble solvents (xylene or toluene) and oils (linseed or soybean) in the ink formulation. Because these components are incompatible with water, they are difficult to jet out of an ink jet pen. By adding the nonionic surfactants to aqueous based inks as prescribed herein, dry time and spreading on the offset media and offset ink can be improved. Additionally, such formulations can be used in an ink jet pen with good reliability. The use of nonionic surfactants as disclosed herein also reduces the amount of heating required to dry inks. As offset papers are often hydrophobically coated, massive amounts of heat may otherwise be required to dry inks, leading to the cost and size of a given printing device to be increased. By improving the penetration of the ink into the coatings through the use of nonionic surfactants, less heat is required to remove the fluid at the surface of the paper. Thus, reduction of ink transfer from sheet to sheet is effectuated.

Another advantage of the present invention is cost savings and convenience to consumers. Commercial offset paper is often much less expensive and are much more available than specialty media paper designed specifically for certain ink jet inks. As the ink jet inks of the present invention have decreased dry time on commercial offset paper, overall printing speed can also be maintained at an acceptable level.

EXAMPLES

The following examples illustrate various formulations for preparing the ink jet ink compositions of the present invention, as well as provide data showing the effectiveness of various nonionic surfactants compared to one another as well as compared to other surfactants. The following examples should not be considered as limitations of the present invention, but should merely teach how to make the best-known ink formulations based upon current experimental data.

Example 1

An ink jet ink is prepared by mixing the following ingredients by weight: 0.4% of an ethoxylated trimethylnonanol, 0.3% of an ethoxlyated tetramethyl decyndiol, 2% of a propylene glycol n-propyl ether, 8% 2-pyrrolidone, 5% ethylene glycol, 4% of a self-dispersed carbon pigment, 2% of an aciylate binder, and the balance in deionized water.

Example 2

An ink jet ink formulation is prepared by mixing the following ingredients by weight: 0.3% of an ethoxylated, 0.3% of an ethoxlyated tetramethyl decyndiol, 8% 2-pyrrolidone, 5% polyethylene glycol, 6% of a self-dispersed carbon pigment, 2% of an acrylate binder, and the balance in deionized water.

Example 3

An ink jet ink is prepared by mixing the following ingredients by weight: 0.9% of a nonionic ethoxylated surfactant, 0.3% of an ethoxlyated tetramethyl decyndiol, 2% of a propylene glycol n-propyl ether, 8% 2-pyrrolidone, 5% ethylene glycol, 4% of a self-dispersed carbon pigment, 1.5% of a acrylate binder, and the balance in deionized water.

Example 4

An ink jet ink is prepared by mixing the following ingredients by weight: 0.5% of an ethoxylated trimethylnonanol, 0.3% of an ethoxylated tetralmethyl decyndiol, 0.15% of an alternative ethoxlyated tetramethyl decyndiol, 8% 2-pyrrolidone, 5% ethylene glycol, 5% polyethylene glycol, 4% of a self-dispersed carbon pigment, 2.5% of an acrylate binder, and the balance in deionized water.

Example 5

For comparison purposes, an ink jet ink is prepared by mixing the following ingredients by weight: 6% 2-pyrrolidone, 2% 1,6-hexanediol, 3% polyethylene glycol, 3% of a self-dispersed carbon pigment, 1% of an acrylate binder, and the balance in deionized water. No surfactant was added to this example.

Example 6

An ink jet ink is prepared by mixing the following ingredients by weight: 0.3% Aerosol TO, 6% 2-pyrrolidone, 2% 1,6-hexanediol, 3% polyethylene glycol, 1% of a propylene glycol n-propyl ether, 3% of a self-dispersed carbon pigment, 1% of an acrylate binder, and the balance in deionized water.

Example 7

An ink jet ink is prepared by mixing the following ingredients by weight: 0.3% of an ethoxylated trimethylnonanol, 0.3% of an ethoxlyated tetiamethyl decyndiol, 6% 2-pyrrolidone, 2% 1,6-hexanediol, 3% polyethylene glycol, 3% of a self-dispersed carbon pigment, 1% of an acrylate binder, and the balance in deionized water.

Example 8

An ink jet ink is prepared by mixing the following ingredients by weight: 0.3% of a silicone glycol copolymer, 0.3% of an ethoxlyated tetramethyl decyndiol, 6% 2-pyrrolidone, 2% 1,6-hexanediol, 3% polyethylene glycol, 1% of a propylene glycol n-propyl ether, 3% of a self-dispersed carbon pigment, 1% of an acrylate binder, and the balance in deionized water.

Example 9

An ink jet ink is prepared by mixing the following ingredients by weight: 0.3% of an ethoxylated surfactant, 0.3% of an ethoxlyated tetramethyl decyndiol, 6% 2-pyrrolidone, 2% 1,6-hexanediol, 1% of a propylene glycol n-propyl ether, 3% polyethylene glycol, 3% of a self-dispersed carbon pigment, 1% of an acrylate binder, and the balance in deionized water.

Example 10

An ink jet ink is prepared by mixing the following ingredients by weight: 0.3 of a fluorosurfactant, 0.3% of an ethoxylated tetramethyl decyndiol, 6% 2-pyrrolidone, 2% 1,6-hexanediol, 1% of a propylene glycol n-propyl e6. ther, 3% polyethylene glycol, 3% of a self-dispersed carbon pigment, 1% of an acrylate binder, and the balance in deionized water.

Example 11

An ink jet ink is prepared by mixing the following ingredients by weight: 0.3% of an ethoxylated trimethylnonanol, 0.3% of an ethoxlyated tetramethyl decyndiol, 6% 2-pyrrolidone, 2% 1,6-hexanediol, 3% of a self-dispersed carbon pigment, 1% of an acrylate binder, and the balance in deionized water.

With respect to Examples 1–4 and 6–11, these combinations of surfactants with pigment, solvents, and binder enable several advantages for use on offset media and offset ink. Some of the advantages shown include excellent 600×600 and 600×300 dpi text and area fill on offset media, minimal coalescence in half tone images on offset media, excellent optical density and edge acuity on coated offset media, good dry time but with reduction in ink dry out in ink jet nozzles, good water fastness, good smudge and rub resistance, and good lightfastness.

Example 12

Tables 1 to 3 show various printing characteristics exhibited on various media including CAROLINA™ Cover, LUSTRO™ Laser gloss (from S. D. Warren), KROMCOTE™ (from Champion papers), and UTOPIA™ Dull (Appleton Papers). Examples 5 to 11 are considered in these tables.

TABLE 1

Print quality of inks on Carolina Cover and printed offset ink on Lustro Laser

| Ink | Print Quality on Carolina ™ Cover | Print Quality on 40% offset ink on Lustro ™ Laser | Print Quality on 100% offset ink on Lustro ™ Laser |
| --- | --- | --- | --- |
| Example 5 | 2 | 1 | 1 |
| Example 7 | 9 | 8 | 6 |
| Example 8 | 9 | 9 | 7 |
| Example 9 | 9 | 9 | 7 |
| Example 10 | 8 | 9 | 7 |
| Example 11 | 9 | 8 | 6 |

In Table 1 above, a visual ranking system from 1–10 was used wherein 1 indicates very poor coverage and 10 indicates excellent coverage. Above about 6 is acceptable coverage. Example 5 illustrates an ink jet ink formulation where no non-ionic surfactant is used. Ink jet inks containing two or more nonionic surfactants showed much better print quality than those inks having no surfactant present.

TABLE 2

Dry time of inks on printed offset media

| Ink % Offset Printed | Lustro ™ Laser | | Kromkote ™ | | Utopia ™ Dull | |
| --- | --- | --- | --- | --- | --- | --- |
|  | 40% | 100% | 40% | 100% | 40% | 100% |
| Example 5 | 30 sec | 600 sec | 20 sec | 30 min | 30 sec | 40 min |
| Example 7 | 15 sec | 60 sec | 15 sec | 9 min | 15 sec | 4 min |
| Example 8 | 15 sec | 60 sec | 20 sec | 3.5 min | 20 sec | 3 min |
| Example 9 | 20 sec | 60 sec | 25 sec | 7 min | 25 sec | 4 min |
| Example 10 | 15 sec | 60 sec | 20 sec | 6.5 min | 30 sec | 3.5 min |
| Example 11 | 15 sec | 60 sec | 15 sec | 9 min | 15 sec | 6 min |

As can be seen in Table 2 above, the dry time on both 40% and 100% printed offset media was much better with inks containing two nonionic surfactants than with those inks containing no surfactant.

TABLE 3

Decap of inks containing non-ionic surfactants as compared to ionic surfactants

| | DECAP |
| --- | --- |
| Example 6 | 6 |
| Example 7 | 9 |
| Example 8 | 8.5 |
| Example 9 | 8 |
| Example 10 | 9 |
| Example 11 | 9.5 |

When an ink jet pen remains uncapped for 30 seconds or more, often missing initial drops can occur. A decap reading is used to determine acceptable parameters for such conditions. Below 6 about not an acceptable decap level. Examples 6 to 11 show ink jet inks that fall within this acceptable range.

Example 13

A pipette which creates 10 microliter drops was used to place surfactant containing solutions onto various commercial offset coated paper surfaces. After the drop was created, the initial wetting/spreading and initial dot size was measured visually. In addition, the time to dry was also measured. Dry time is defined as the amount of time required when the drop is placed onto the media to when all the fluid is visibly gone from the media surface via penetration or evaporation. The three offset coated papers used are LUSTRO™ Laser gloss, KROMCOTE™, and UTOPIA™ Dull. Measurements were conducted at ambient conditions.

In the tables below, the surfactants were screened in various 30% organic solvents with 3% active surfactant by weight. Solutions containing only water and 30% solvent with no surfactant present were also included as a control. As can be seen from the tables, many of the lower HLB nonionic surfactant solutions showed better drying results than the control sample and samples having higher HLB nonionic surfactant values. Further, as shown, in a given surfactant family, the lower HLB homologues generally perform better than those formulations where anionic (an), amphoteric (amp), and cationic (cat) surfactants were used.

TABLE 4

Nonionic surfactant examples screened in solutions comprising 30% dimethylpropionamide and 3% surfactant by weight

| | | Dry Time (min) | | | Dot Size (cm) | | |
| --- | --- | --- | --- | --- | --- | --- | --- |
| Surfactant | HLB | Utopia | Lustro | Krom | Utopia | Lustro | Krom |
| None Added | | >30 | 14 | >30 | 0.4 | 0.7 | 0.4 |
| Alkyl Sulfonate (an) | | 24 | 15 | 22 | 0.7 | 0.7 | 0.5 |
| Alkyl Benzene Sulfonate (an) | | 17 | 16 | 17 | 0.6 | 0.5 | 0.5 |
| Amphoteric betaine (amp) | | 14 | 19 | 21 | 0.7 | 0.6 | 0.6 |

TABLE 4-continued

Nonionic surfactant examples screened in solutions comprising 30% dimethylpropionamide and 3% surfactant by weight

| | | Dry Time (min) | | | Dot Size (cm) | | |
|---|---|---|---|---|---|---|---|
| Surfactant | HLB | Utopia | Lustro | Krom | Utopia | Lustro | Krom |
| Propoxylated Amine (cat) | | 30 | 21 | >30 | 0.7 | 0.6 | 0.5 |
| 1A | 15.3 | 25 | 14 | 30 | 0.8 | 0.6 | 0.4 |
| 1B | 12.4 | 21 | 20 | 20 | 0.8 | 0.6 | 0.4 |
| 2A | 10.5 | 3 | 5 | 3 | 1.8 | 1.0 | 1.5 |
| 2B | 12.4 | 2 | 6 | 4 | 1.6 | 1.0 | 1.1 |
| 2C | 14.7 | 10 | 9 | 19 | 1.0 | 0.8 | 0.7 |
| 2D | 16.4 | 14 | 13 | 23 | 0.7 | 0.7 | 0.5 |
| 2E | 8 | n/a | n/a | n/a | n/a | n/a | n/a |
| 2F | 16.1 | 3 | 10 | 19 | 2.0 | 0.9 | 0.7 |
| 3A | 10.4 | 11 | 20 | 12 | 2.0 | 0.9 | 1.5 |
| 3B | 13.5 | 8 | 14 | 18 | 1.0 | 0.7 | 0.5 |
| 4A | 9.6 | 2 | 8 | 3 | 1.6 | 0.7 | 1.4 |
| 4B | 12.6 | 3 | 14 | 12 | 1.3 | 0.8 | 0.6 |
| 5A | 5–8 | 2 | 3 | 2 | 2.0 | 1.7 | 1.8 |
| 5B | 13–17 | 3 | 9 | 8 | 2.3 | 0.7 | 0.9 |
| 5C | 13–17 | 14 | 23 | 16 | n/a | 0.6 | 0.8 |
| 6A | 8 | 2 | 13 | 2 | 2.2 | 0.8 | 2.0 |
| 6B | 13 | 16 | 15 | 34 | 1.1 | 1.0 | 0.6 |
| 6C | 8–11 | 3 | 13 | 4 | 2.5 | 1.0 | 1.4 |
| 6D | 11–15 | 4 | 13 | 8 | 2.0 | 0.9 | 1.1 |

Nonionic surfactants:
1A, 1B — polyoxyethylene ethers
2A, 2B, 2C, 2D, 2E, 2F — alkoxylated trimethylnonanols
3A, 3B — alkoxylated octylphenols
4A, 4B — alkyl phenoxypoly(alkyleneoxy)ethanols
5A, 5B, 5C — silicone glycol copolymers
6A, 6B, 6C, 6D — alkoxylated tetramethyl decyndiols

TABLE 5

Nonionic surfactant examples screened in solutions comprising 30% propylene glycol n-propyl ether solutions and 3% surfactant by weight

| | | Dry Time (min) | | | Dot Size (cm) | | |
|---|---|---|---|---|---|---|---|
| Surfactant | HLB | Utopia | Lustro | Krom | Utopia | Lustro | Krom |
| None Added | | 10 | 10 | 16 | 1.0 | 1.0 | 0.6 |
| Alkyl Sulfonate (an) | | 11 | 8 | 14 | 1.0 | 0.9 | 0.5 |
| Alkyl Benzene Sulfonate (an) | | 17 | 12 | 17 | 0.8 | 0.6 | 0.7 |
| Amphoteric betaine (amp) | | 11 | 14 | 14 | 0.9 | 0.7 | 0.8 |
| Propoxylated Amine (cat) | | 12 | 15 | 15 | 0.8 | 0.7 | 1.0 |
| 1A | 15.3 | 11 | 12 | 15 | 0.8 | 0.6 | 0.7 |
| 1B | 12.4 | 10 | 11 | 12 | 0.9 | 0.5 | 0.7 |
| 2A | 10.5 | 10 | 10 | 10 | 1.0 | 0.8 | 0.7 |
| 2B | 12.4 | 10 | 12 | 13 | 0.9 | 0.8 | 0.7 |
| 2C | 14.7 | 9 | 9 | 14 | 0.9 | 0.7 | 0.7 |
| 2D | 16.4 | 12 | 12 | 16 | 1.0 | 1.0 | 1.0 |
| 2E | 8 | 3 | 6 | 6 | 1.7 | 0.7 | 1.4 |
| 2F | 16.1 | 9 | 12 | 12 | 1.0 | 0.7 | 0.7 |
| 3A | 10.4 | 9 | 6 | 11 | 0.8 | 0.7 | 0.8 |
| 3B | 13.5 | 10 | 12 | 16 | 1.0 | 0.7 | 0.8 |
| 4A | 9.6 | 9 | 8 | 11 | 0.9 | 0.7 | 0.7 |
| 4B | 12.6 | 10 | 10 | 13 | 0.8 | 0.6 | 0.8 |
| 5A | 5–8 | 1 | 6 | 4 | 1.4 | 0.8 | 0.9 |
| 5B | 13–17 | 4 | 9 | 8 | 1.1 | 0.7 | 0.7 |
| 5C | 13–17 | 4 | 9 | 11 | 1.1 | 0.8 | 0.7 |
| 6A | 8 | 7 | 11 | 11 | 1.0 | 0.8 | 0.8 |
| 6B | 13 | 10 | 12 | 16 | 0.7 | 0.7 | 0.9 |
| 6C | 8–11 | 6 | 12 | 12 | 1.0 | 0.9 | 0.9 |
| 6D | 11–15 | 8 | 11 | 15 | 1.0 | 0.8 | 0.8 |

Nonionic surfactants:
1A, 1B — polyoxyethylene ethers
2A, 2B, 2C, 2D, 2E, 2F — alkoxylated trimethylnonanols
3A, 3B — alkoxylated octylphenols
4A, 4B — alkyl phenoxypoly(alkyleneoxy)ethanols
5A, 5B, 5C — silicone glycol copolymers
6A, 6B, 6C, 6D — alkoxylated tetramethyl decyndiols As can be seen from Tables 4 and 5, many types such as anionic, cationic, or amphoteric surfactants are not as effective as many lower HLB nonionic surfactants for drying and dot grain. For example, the alkyl sulfonate (Na $C^{14}$–$C^{16}$ olefine sulfonate), alkyl benzene sulfonate (Na N-hexadecyl diphenyloxide disulfonate), amphoteric betaine (amine oxide), and propoxylated amine (diethylammonium), as well as formulations where no surfactant was added, are generally less effective than formulations where lower HLB nonionic surfactants are used.

TABLE 6

Nonionic surfactant examples screened in solutions comprising 30% 2-pyrrolidone and 3% surfactant by weight

| | | Dry Time (min) | | | Dot Size (cm) | | |
|---|---|---|---|---|---|---|---|
| Surfactant | HLB | Utopia | Lustro | Krom | Utopia | Lustro | Krom |
| None Added | | >30 | 10 | >30 | 0.3 | 0.6 | 0.3 |
| Alkoxylated trimethyl-nonanol | 10.5 | 4 | 11 | 3 | 1.6 | 1.1 | 1.5 |
| Silicone glycol copolymer | 5–8 | 3 | 2 | 2 | 2.0 | 2.0 | 1.6 |

TABLE 7

Nonionic surfactant examples screened in solutions comprising 30% 1,5 Pentanediol and 3% surfactant by weight

| | | Dry Time (min) | | | Dot Size (cm) | | |
|---|---|---|---|---|---|---|---|
| Surfactant | HLB | Utopia | Lustro | Krom | Utopia | Lustro | Krom |
| None Added | | >30 | >30 | >30 | 0.6 | 0.7 | 0.4 |
| Alkoxylated trimethyl-nonanol | 10.5 | 16 | 9 | 10 | 1.8 | 0.8 | 1.5 |
| Silicone glycol copolymer | 5–8 | 12 | 14 | 7 | 1.9 | 0.9 | 1.4 |

TABLE 8

Nonionic surfactant examples screened in solutions comprising 30% diethylene glycol and 3% surfactant by weight

| | | Dry Time (min) | | | Dot Size (cm) | | |
|---|---|---|---|---|---|---|---|
| Surfactant | HLB | Utopia | Lustro | Krom | Utopia | Lustro | Krom |
| None Added | | >30 | 27 | >30 | 0.4 | 0.6 | 0.4 |
| Alkoxylated trimethyl-nonanol | 10.5 | >30 | 14 | 6 | 1.9 | 1.2 | 1.4 |
| Silicone glycol copolymer | 5–8 | 27 | 6 | 7 | 1.4 | 1.8 | 1.2 |

TABLE 9

Nonionic surfactant examples screened in solutions comprising 30% glycerol and 3% surfactant by weight

| | | Dry Time (min) | | | Dot Size (cm) | | |
|---|---|---|---|---|---|---|---|
| Surfactant | HLB | Utopia | Lustro | Krom | Utopia | Lustro | Krom |
| None Added | | >>30 | >>30 | >>30 | 0.3 | 0.5 | 0.3 |
| Alkoxylated trimethyl-nonanol | 10.5 | >30 | >30 | >30 | 2.3 | 0.9 | 1.4 |
| Silicone glycol copolymer | 5–8 | >30 | >30 | 7 | 1.7 | 1.8 | 1.5 |

As illustrated in tables 6 to 9, two specific nonionic surfactants having an HLB values of less than 12 showed improved dry time and acceptable: dot grain over ink formulations where nonionic surfactant was not added.

Example 14

An ink jet ink is prepared by mixing the following ingredients by weight: 20% 2-pyrrolidone, 2% Acid Red 52 dye (Na salt form), and the balance in deionized water.

Example 15

An ink jet ink is prepared by mixing the following ingredients by weight: 20% 2-pyrrolidone, 2% Acid Red 52 dye (Na salt form), 2% of an ethoxylated trimethylnonanol, and the balance in deionized water.

Example 16

An ink jet ink is prepared by mixing the following ingredients:by weight: 20% 2-pyrrolidone, 2% Acid Red 52 dye (Na salt form), 2% of an ethoxylated trimethylnonanol, and the balance in deionized water.

Example 17

An ink jet ink is prepared by mixing the following ingredients; by weight: 20% 2-pyrrolidone, 2% Acid Red 52 dye (Na salt form), 2% of an anionic surfactant (alkyl sulfonate), and the balance in deionized water.

Example 18

Inks from example 14 to 17 were printed onto three different offset coated papers using an HP2000C printer. The three offset coated papers used were LUSTRO™ Laser gloss (from S. D. Warren), KROMCOTE™ (from Champion papers), and UTOPIA™ Dull (Appleton Papers). Dry time measurements were conducted at ambient conditions. Each ink was tested for drying performance on the coated offset media by printing a solid bar pattern (approximate size is 7"×0.5") on a four-pass print-mode. With respect to this pattern, the ink density is approximately 96 picoliters/300 dots/inch pixel. After the plot was completed, 10 sheets of the same type of coated media were placed upon the paper having the solid bar pattern after a measured amount of time delay. The measured time delay corresponds to the amount of time required for the ink to fully dry, which is defined as no or very minimal ink transfer to the 10 sheets of coated media after stacking. Table 10 below outlines the dry time performance of each ink corresponding to Examples 14 to 17.

TABLE 10

Comparative dry time performance for various inkjet ink compositions

| INK | COMMENTS (HLB) | LUSTRO (sec) | UTOPIA (sec) | KROMCOTE (sec) |
|---|---|---|---|---|
| Example 14 | No surfactant | 58 | 56 | 21 |
| Example 15 | Alkoxylated trimethylnonanol (10.5) | 23 | 21 | 12 |
| Example 16 | Alkoxylated trimethylnonanol (16.4) | 53 | 45 | 24 |
| Example 17 | Alkyl sulfonate | 56 | 53 | 24 |

As can be seen by the table above, addition of a low HLB nonionic surfactant decreases the time delay. For example, the use of the alkoxylated trimethylnonanol with low HLB provides much better dry time than formulations having no surfactant, higher HLB surfactant, or anionic surfactant (alkyl sulfonate).

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

We claim:

1. An aqueous ink composition for ink jet printing on offset, media, said ink composition comprising:
    a) from 0.1% to 10% by weight of an ink colorant consisting essentially of a dye; and
    b) from 0.01% to 10% by weight of a nonionic surfactant having an HLB value from about 4 to 14, with the proviso that said ink has a dry time on offset media that is less than the dry time of the substantially same ink devoid of the nonionic surfactant.

2. The aqueous ink composition of claim 1 further comprising a second nonionic surfactant having an HLB value from about 4 to 14.

3. The aqueous ink composition of claim 2 wherein the second nonionic surfactant is present at from about 0.01% to 10% by weight.

4. The aqueous ink composition of claim 3 wherein the nonionic surfactant and the second nonionic surfactant are each present at from about 0.01% to 2% by weight.

5. The aqueous ink composition of claim 2 further comprising a water soluble or water dispersible polymeric binder being present at from about 0.01% to 10% by weight.

6. The aqueous ink composition of claim 5 wherein the binder is selected from the group consisting of acrylates, polyamides, vinyl alcohols, vinyl acetates, polyvinylpyrrolidones, cellulosics, urethanes, and combinations thereof.

7. The aqueous ink composition of claim 6 wherein the binder is an acrylate binder.

8. The aqueous ink composition of claim 1 wherein the nonionic surfactant is selected from the group consisting of alkoxylated octylphenols, alkyl phenoxypoly(alkyleneoxy) ethanols, silicone glycol copolymers, polyalkylene oxide-modified polydimethylsiloxanes, alkoxlyated tetramethyl decyndiols, secondary alcohol alkoxylates, alkoxylated trimethylnonanols, polyoxyethylene ethers, ethylene oxide/propylene oxide copolymers, fluorosurfactants; and combinations thereof.

9. An aqueous ink composition for ink jet printing on offset media, said ink composition comprising:
   a) from 0.1% to 10% by weight of a pigment;
   b) at least two nonionic surfactants, each being present at from about 0.01% to 10% by weight; and
   c) from 0.1% to 10% by weight of at least one binder, with the proviso that said ink has a dry time on offset media that is less than the dry time of the substantially same ink devoid of the nonionic surfactant.

10. The aqueous ink composition of claim 9 wherein at least one of the at least two nonionic surfactants has an HLB value from about 4 to 14.

11. The aqueous ink composition of claim 10 wherein the at least two nonionic surfactants have an HLB value from about 4 to 14.

12. The aqueous ink composition of claim 9 wherein the binder is selected from the group consisting of acrylates, polyamides, vinyl alcohols, vinyl acetates, polyvinylpyrrolidones, cellulosics, urethanes, and combinations thereof.

13. The aqueous ink composition of claim 9 wherein the at least two nonionic surfactants are each present at from about 0.01% to 2% by weight.

14. The aqueous ink composition of claim 9 further comprising a solvent selected from the group consisting of propylene glycol ethers, pentanediols, pyrrolidones, ethylene glycols, polyethylene glycols, glycerols, and combinations thereof, wherein said solvent is present at from about 0.5 to 50% by weight.

15. The aqueous ink composition of claim 9 wherein each of the at least two nonionic surfactants are independently selected from the group consisting of alkoxylated octylphenols, alkyl phenoxypoly(alkyleneoxy)ethanols, silicone glycol copolymers, polyalkylene oxide-modified polydimethylsiloxanes, alkoxlyated tetramethyl decyndiols, secondary alcohol alkoxylates, alkoxylated trimethylnonanols, polyoxyethylene ethers, ethylene oxide/propylene oxide copolymers, fluorosurfactants, and combinations thereof.

16. The aqueous ink jet composition of claim 9 wherein the binder has a weight average molecular weight from about 1,000 to 15,000.

17. The aqueous ink composition of claim 1 wherein said ink has a dry time on offset media that is at least two times faster than the substantially same ink devoid of the nonionic surfactant.

18. The aqueous ink composition of claim 9 wherein said ink has a dry time on offset media that is at least three times faster than the substantially same ink devoid of the non-ionic surfactant.

19. A method of ink jet printing on offset media, comprising:
   a) providing offset media having a substantially hydrophobic coating; and
   b) printing an aqueous ink jet ink onto said offset media, said ink jet ink comprising from 0.1% to 10% by weight of an ink colorant, and from 0.01% to 10% by weight of a nonionic surfactant.

20. The method of claim 19 wherein said ink has a dry time on offset media that is less than the dry time of the substantially same ink devoid of the nonionic surfactant.

21. The method of claim 19 further comprising from 0.01% to 10% by weight a second nonionic surfactant.

22. The method of claim 21 wherein the nonionic surfactant and the second nonionic surfactant are each present at from about 0.01% to 2% by weight, and have an HLB value from 4 to 14.

23. The method of claim 19 further comprising from 0.1% to 10% by weight of at least one water soluble or water dispersible polymeric binder.

24. The method of claim 23 wherein the binder is selected from the group consisting of acrylates, polyamides, vinyl alcohols, vinyl acetates, polyvinylpyrrolidones, cellulosics, urethanes, and combinations thereof.

25. A system for of ink jet printing images, comprising:
   a) offset media having a substantially hydrophobic coating; and
   b) an aqueous ink jet ink configured for printing on said offset media, said ink jet ink comprising from 0.1% to 10% by weight of an ink colorant, and from 0.1 to 10% by weight of a nonionic surfactant.

26. The system of claim 25 wherein the ink colorant is a dye, and said ink has a dry time on offset media that is at least two times faster than the dry time of the substantially same ink devoid of the nonionic surfactant.

27. The system of claim 25 wherein the ink colorant is a pigment, and said ink has a dry time on offset media that is at least three times faster than the dry time of the substantially same ink devoid the nonionic surfactant.

28. The system of claim 25 further comprising from 0.01% to 10% by weight a second nonionic surfactant.

29. The system of claim 25 wherein the nonionic surfactant and the second nonionic surfactant are each present at from about 0.01% to 2% by weight, and have an HLB value from 4 to 14.

30. The system of claim 25 further comprising from 0.1% to 10% by weight of at least one water soluble or water dispersible polymeric binder.

31. The system of claim 30 wherein the binder is selected from the group consisting of acrylates, polyamides, vinyl alcohols, vinyl acetates, polyvinylpyrrolidones, cellulosics, urethanes, and combinations thereof.

* * * * *

UNITED STATES PATENT AND TRADEMARK OFFICE
CERTIFICATE OF CORRECTION

PATENT NO.   : 6,461,418 B1
DATED        : October 8, 2002
INVENTOR(S)  : Yue et al.

It is certified that error appears in the above-identified patent and that said Letters Patent is hereby corrected as shown below:

<u>Column 12,</u>
Line 46, delete "offset," and insert therefor -- offset --.

Signed and Sealed this

Thirtieth Day of December, 2003

JAMES E. ROGAN
*Director of the United States Patent and Trademark Office*